United States Patent
Joffe

(10) Patent No.: US 10,452,418 B2
(45) Date of Patent: Oct. 22, 2019

(54) LOCATION BASED MANAGEMENT OF VIRTUAL MACHINES IN DATACENTERS

(71) Applicant: VMware, Inc., Palo Alto, CA (US)

(72) Inventor: Neil Raymond Joffe, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 262 days.

(21) Appl. No.: 14/109,602

(22) Filed: Dec. 17, 2013

(65) Prior Publication Data

US 2015/0169349 A1 Jun. 18, 2015

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01)

(58) Field of Classification Search
CPC ............... G06F 2009/4557; G06F 9/45533–46
See application file for complete search history.

(56) References Cited

U.S. PATENT DOCUMENTS

| 7,917,617 | B1* | 3/2011 | Ponnapur | G06F 9/455 709/224 |
|---|---|---|---|---|
| 8,171,142 | B2 | 5/2012 | Kolin et al. | |
| 8,341,626 | B1* | 12/2012 | Gardner | G06F 9/4856 718/1 |
| 8,458,329 | B2 | 6/2013 | Kolin et al. | |
| 8,959,173 | B1* | 2/2015 | Robidoux | G06F 9/5088 709/201 |
| 2006/0171538 | A1* | 8/2006 | Larson | G01S 13/751 380/270 |
| 2008/0256530 | A1* | 10/2008 | Armstrong | G06F 9/45533 717/174 |
| 2009/0089781 | A1* | 4/2009 | Shingai | G06F 9/5088 718/1 |
| 2010/0228861 | A1* | 9/2010 | Arsovski | G06F 9/5027 709/226 |
| 2010/0287560 | A1* | 11/2010 | Neft | G06F 9/4856 718/104 |

(Continued)

OTHER PUBLICATIONS

Live and Incremental Whole-System Migration of Virtual Machines Using Block-Bitmap Yingwei Luo, Binbin Zhang, Xiaolin Wang, Zhenlin Wang, Yifeng Sun, Haogang Chen Published: 2008*

(Continued)

*Primary Examiner* — Emerson C Puente
*Assistant Examiner* — Paul V Mills
(74) *Attorney, Agent, or Firm* — Thomas | Horstemeyer, LLP

(57) ABSTRACT

Embodiments manage physical locations of virtual machines (VMs) in a datacenter. A computing device, such as a cloud management device, aggregates location information for the VMs executing on hosts. The computing device compares the aggregated location information with event data to identify VMs potentially affected by adverse events (e.g., severe weather, scheduled maintenance, natural disasters, etc.). The computing device initiates migration of the affected VMs from their hosts to unaffected hosts. In some embodiments, the location information includes global positioning system (GPS) coordinates obtained by the hosts and shared with the computing device.

18 Claims, 9 Drawing Sheets

(56) References Cited

U.S. PATENT DOCUMENTS

| | | | | |
|---|---|---|---|---|
| 2010/0325634 A1* | 12/2010 | Ichikawa | .............. | G06F 9/4856 718/103 |
| 2012/0005344 A1* | 1/2012 | Kolin | ................ | H05K 7/20836 709/226 |
| 2012/0030686 A1* | 2/2012 | Mukherjee | ............ | G06F 9/5077 718/105 |
| 2013/0007738 A1* | 1/2013 | McCloy | .............. | G06F 9/45558 718/1 |
| 2013/0311632 A1* | 11/2013 | Chang | ................... | G06F 9/5072 709/223 |
| 2014/0006671 A1* | 1/2014 | Das | ........................ | G06F 13/14 710/305 |
| 2014/0215486 A1* | 7/2014 | DeRosa | ................. | G06F 9/485 718/105 |

OTHER PUBLICATIONS

CloudNet: Dynamic Pooling of Cloud Resources by Live WAN Migration of Virtual Machines Timothy Wood, Prashant Shenoy, K.K. Ramakrishnan Jacobus, Van der Merwe Published: 2011.*

Method and System to locate virtual machine in a datacenter environment IBM IP.com No. IPCOM000175766D (Year: 2008).*

Demerjian, Charlie, "Intel Shows Off Rack Scale Architecture and Rack Disaggregation Plans", SemiAccurate—On Target Technology News, accessed at <<http://semiaccurate.com/2013/04/09/intel-shows-off-rack-scale-architecture-and-rack-disaggregation-plans/>>, Apr. 9, 2013, 6 pages.

Unknown, "VMware vCloud Hybrid Service", Datasheet, accessed at <<http://www.vmware.com/files/pdf/vchs/vCloud-Hybrid-Service-Datasheet.pdf>>, May 2013, 2 pages.

* cited by examiner

LOCATION BASED MANAGEMENT OF VIRTUAL MACHINES IN DATACENTERS

BACKGROUND

Cloud-based datacenters have thousands of virtual machines (VMs) executing on hosts. The hosts reside in racks within the datacenters. The large size of the datacenters adds to the difficulty of locating hardware within the datacenters. Some existing systems use global positioning systems (GPS) to locate the physical position of the racks within the datacenters for maintenance and upgrades. Other existing systems use radio frequency identification (RFID) and long-range navigation (LORAN). Even with the knowledge of the physical rack locations, however, the existing systems lack a mechanism for determining the physical location of each VM executing on the hosts in the datacenter.

Further complicating this effort, VMs often move from host to host, and from datacenter to datacenter. VMs are migrated as their resource needs change, as the available resources within the datacenters change, for load-balancing purposes, for backup and restore operations, and the like. For example, thousands of VMs may be in the process of migration at any one point in time. Tracking the location of the VMs during these concurrent migrations is difficult.

In some existing systems, an administrator manually identifies the target hosts to receive the VMs to be moved. These existing systems lack an automated mechanism for determining where to locate each VM to be moved within the datacenters, and the conditions under which to move the VMs.

SUMMARY

One or more embodiments described herein relocate virtual machines (VMs) in anticipation of adverse events. A computing device, such as a cloud management device, aggregates location information for the VMs from one or more hosts executing the VMs in a virtualized datacenter. The computing device compares the aggregated location information with event data describing the potentially adverse events to identify affected VMs. The computing device migrates one or more of the affected VMs, in anticipation of the adverse events, to hosts not affected by the adverse events.

To facilitate aggregation of the location information, embodiments described herein contemplate the inclusion of positioning systems in virtualized datacenters. The positioning systems, such as global positioning systems, enable each host to determine and transmit the location information for the VMs executing on the host to the computing device.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Embodiments described herein maintain an inventory of virtual machines (VMs) and corresponding location information. Location information describes, among other data, a physical location of resources (e.g., processing, storage, memory, power, etc.) associated with VMs. In some embodiments, a cloud management device leverages location information to relocate one or more of VMs in anticipation of future, potentially adverse events. In such embodiments, cloud management device receives event data describing the potentially adverse events, and compares the event data with location information to identify and move affected VMs. In this manner, cloud management device protects the affected VMs and prevents downtime, loss of data, and the like.

By reporting location information, such as global positioning system (GPS) coordinates, to a computing device such as cloud management device, aspects of the disclosure enable creation of an inventory of VMs and corresponding location information in a virtualized datacenter. By combining a logical inventory of VMs (e.g., which VM is executed by which host) and a physical inventory (e.g., a physical location of host executing VM), cloud management device is able to blunt or otherwise mitigate the effects of adverse events, make a more informed selection of target hosts to receive affected VMs, and improve efficiency. In some embodiments, location information represents a topology of the virtualized datacenter.

Embodiments of the disclosure enable locating VMs moved to another datacenter prior to a disaster, move VMs closer to newer storage racks for improved performance, move VMs away from a section of the datacenter about to undergo maintenance or improvement, and more.

Figure 1:
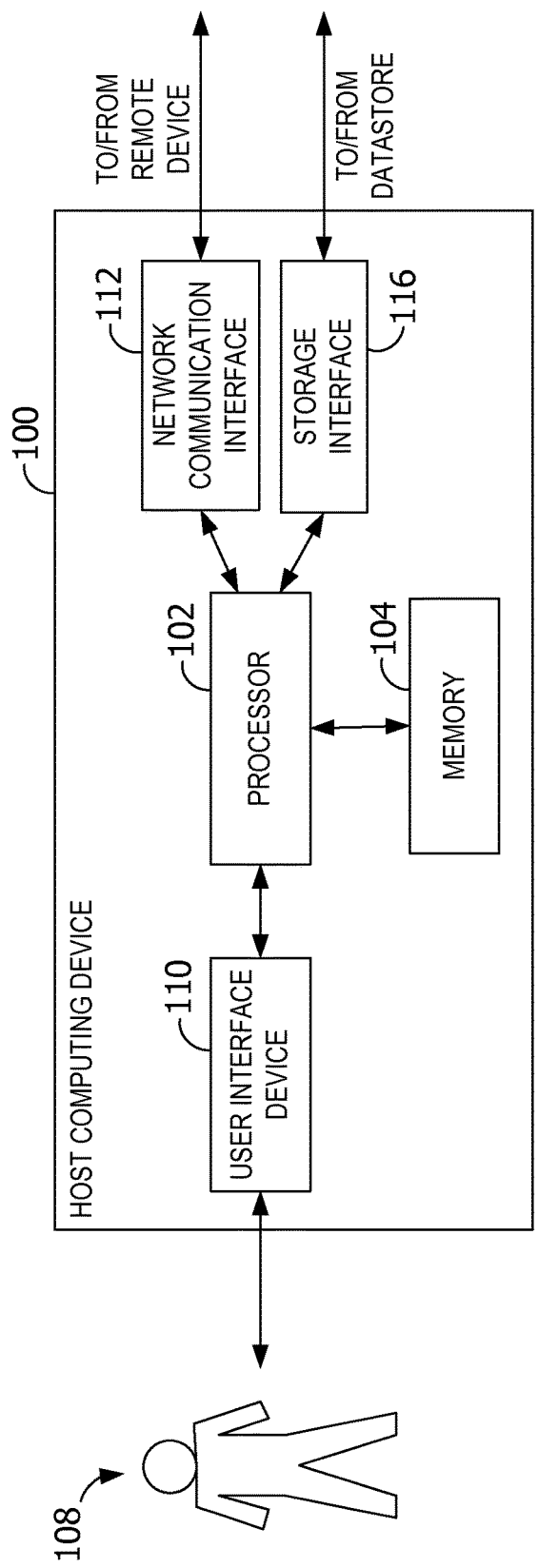
FIG. 1 is a block diagram of an exemplary host computing device.

FIG. 1 is a block diagram of an exemplary host computing device 100, also referred to as host 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks. In another example, hard disks and/or optical disks are located in a datastore (e.g., locally or remotely attached).

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
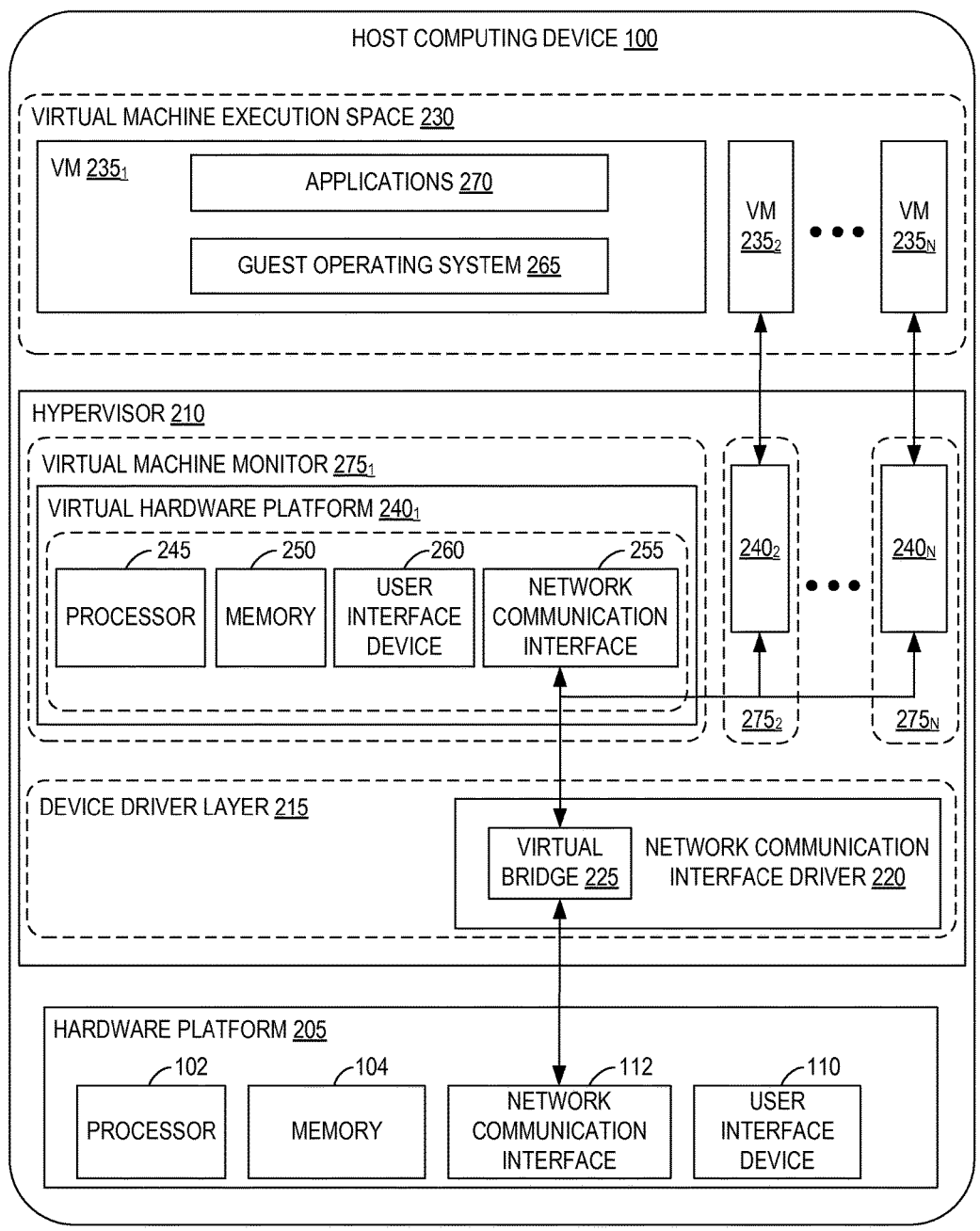
FIG. 2 is a block diagram of virtual machines that are instantiated on a computing device, such as the host computing device shown in FIG. 1.

FIG. 2 depicts a block diagram of virtual machines 235$_1$, 235$_2$ . . . 235$_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs 235$_1$-235$_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs 235$_1$-235$_N$ such that each of VMs 235$_1$-235$_N$ has its own virtual hardware platform (e.g., a corresponding one of virtual hardware platforms 240$_1$-240$_N$), each virtual hardware platform having its own emulated hardware (such as a processor 245, a memory 250, a network communication interface 255, a user interface device 260 and other emulated I/O devices in VM 235$_1$). Hypervisor 210 may manage (e.g., monitor, initiate, and/or terminate) execution of VMs 235$_1$-235$_N$ according to policies associated with hypervisor 210, such as a policy specifying that VMs 235$_1$-235$_N$ are to be automatically restarted upon unexpected termination and/or upon initialization of hypervisor 210. In addition, or alternatively, hypervisor 210 may manage execution VMs 235$_1$-235$_N$ based on requests received from a device other than host computing device 100. For example, hypervisor 210 may receive an execution instruction specifying the initiation of execution of first VM 235$_1$ from a management device via network communication interface 112 and execute the execution instruction to initiate execution of first VM 235$_1$.

In some embodiments, memory 250 in first virtual hardware platform 240$_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM 235$_1$ in a single file or in a plurality of files, each of which includes a portion of the file system. In addition, or alternatively, virtual disk images may be stored on one or more remote computing devices, such as in a storage area network (SAN) configuration. In such embodiments, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs 235$_1$-235$_N$). Each virtual communication interface for each VM 235$_1$-235$_N$, such as network communication interface 255 for first VM 235$_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs 235$_1$-235$_N$. This configuration enables an Ethernet packet that has a virtual MAC address as its destination address to properly reach the VM in host computing device 100 with a virtual communication interface that corresponds to such virtual MAC address.

Virtual hardware platform 240$_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM 2351. Virtual hardware platforms 2401-240N may be considered to be part of virtual machine monitors (VMM) 2751-275N that implement virtual system support to coordinate operations between hypervisor 210 and corresponding VMs 2351-235N. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms 2401-240N may also be considered to be separate from VMMs 2751-275N, and VMMs 2751-275N may be considered to be separate from hypervisor 210. One example of hypervisor 210 that may be used in an embodiment of the disclosure is included as a component in VMware's ESX brand software, which is commercially available from VMware, Inc.

Figure 3:
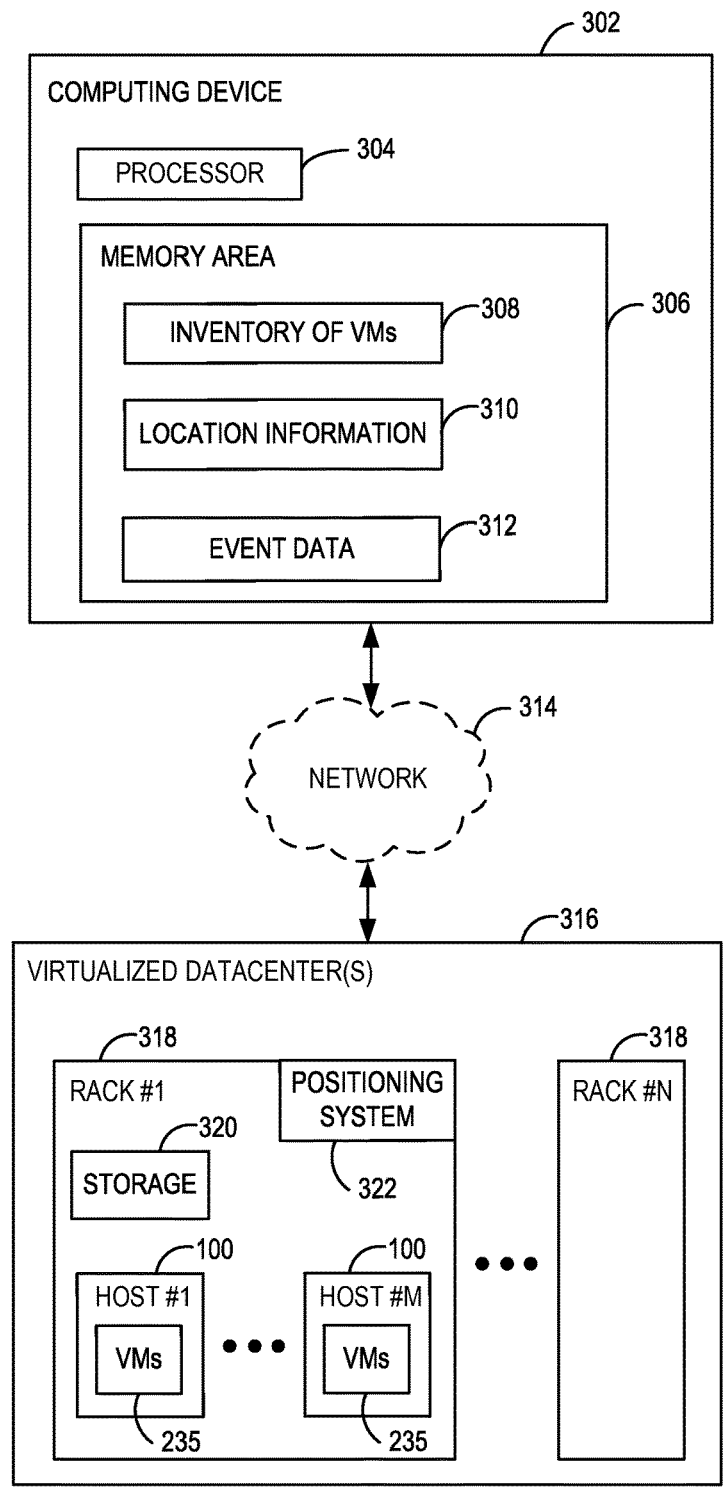
FIG. 3 is a block diagram of an exemplary computing device proactively managing migration of virtual machines in datacenters.

FIG. 3 is a block diagram of an exemplary computing device 302 proactively managing migration of VMs 235 in one or more virtualized datacenters 316. An administrator, or other user 108, interacts with computing device 302. Computing device 302 represents any device executing instructions (e.g., as application programs, operating system functionality, or both) to implement the operations and functionality associated with computing device 302. For example, computing device 302 executes instructions to relocate VMs 235 in anticipation of adverse events. Computing device 302 may include any computing device or processing unit. For example, computing device 302 may represent a group of processing units or other computing devices, such as in a cloud computing configuration. In such an example, computing device 302 may be associated with a particular virtualized datacenter 316.

Computing device 302 has at least one processor 304 and a memory area 306. Processor 304 includes any quantity of processing units, and is programmed to execute computer-executable instructions for implementing aspects of the disclosure. The instructions may be performed by processor 304 or by multiple processors executing within computing device 302, or performed by a processor external to computing device 302. In some embodiments, processor 304 is programmed to execute instructions such as those illustrated in the figures to protect VMs 235 in anticipation of adverse events affecting virtualized datacenter 316.

Memory area 306 includes any quantity of computer-readable media associated with or accessible by computing device 302. Memory area 306, or portions thereof, may be internal to computing device 302, external to computing device 302, or both.

In the example of FIG. 3, memory area 306 further stores an inventory 308 of VMs 235 in one or more of virtualized datacenters 316. Inventory 308 may be represented as data identifying hosts 100 associated with virtualized datacenter 316 and VMs 235 registered or otherwise associated with each of hosts 100. Inventory 308 may be stored as records in a database, fields in a flat file, elements in one or more sets, and/or via other data management means.

Memory area 306 further stores location information 310 describing physical locations of VM 235 in virtualized datacenter 316, aggregated from hosts 100. Event data 312 is received by computing device 302 and stored in memory area 306. Location information 310 and event data 312 are described further with reference to FIG. 4.

Computing device 302 communicates with one or more of virtualized datacenters 316 by, for example, one or more networks 314. Networks 314 include any means for communication between computing device 302 and virtualized datacenter 316, such as intranets, internets, local area networks, wide area networks, and the like. Further, each network 314 may be implemented as a wired network, a wireless network, and/or a bus (e.g., as a system on a chip). However, aspects of the disclosure are operable with any network type or configuration.

Virtualized datacenter 316 includes a plurality of physical racks 318, such as rack #1 through rack #N. In some embodiments, each rack 318 has storage 320, and one or more hosts 100 such as host #1 through host #M. Each of hosts 100 executes at least one VM 235. Each rack 318 further has at least one positioning system 322 associated therewith. Positioning systems 322 generally include two-dimensional positioning systems, three-dimensional positioning systems, satellite-based positioning systems, radio frequency-based positioning systems, and the like. An example satellite-based positioning system includes a GPS. Examples of a radio frequency-based positioning system include a radio frequency identification (RFID), BLUETOOTH brand communication, white space systems, and the like. Each of positioning systems 322 may include a transmitter and, in some embodiments, a receiver. Positioning system 322 may be located on racks 318, motherboards, or otherwise co-located with one or more hosts 100.

In some embodiments, computing device 302 is located separate from virtualized datacenter 316, as shown in FIG. 3. In other embodiments, computing device 302 is located with virtualized datacenter 316, or in another virtualized datacenter 316.

Figure 4:
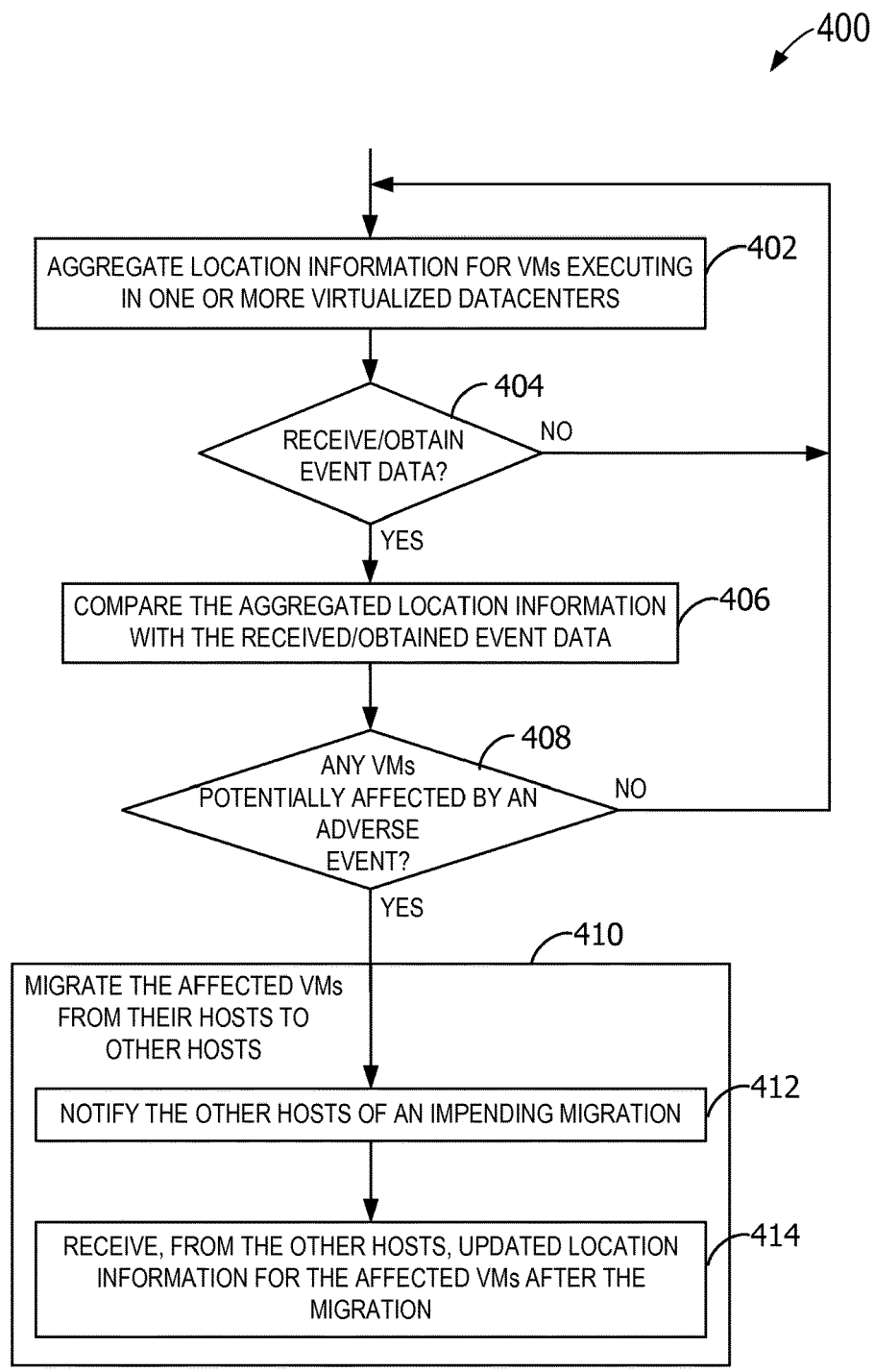
FIG. 4 is a flowchart of an exemplary method performed by a computing device to select and migrate virtual machines in anticipation of adverse events affecting the virtual machines.

FIG. 4 is a flowchart of an exemplary method performed by computing device 302 to select and migrate virtual machines in anticipation of adverse events affecting the virtual machines. While method 400 is described with reference to execution by computing device 302 (shown in FIG. 3), it is contemplated that method 400 may be performed by any computing device. For example, method 400 may be performed by a computing device (e.g., one of hosts 100) not affected by a potentially adverse event, as defined by event data 312. For example, method 400 is performed by a computing device located remote from virtualized datacenter 316. Further, in some embodiments, the operations illustrated in FIG. 4 may be stored as computer-executable instructions on one or more computer-readable media. The instructions may be kernel-level instructions.

Hosts 100 in virtualized datacenter 316 execute a driver, plug-in, or other instructions to obtain location information 310 (e.g., GPS data) for themselves from co-located GPS devices. Each host 100 that has obtained location information 310 about itself exports location information 310 along with information describing a set of VMs 235 executing on that host 100 to computing device 302. Location information 310 may also describe one or more error conditions, such as whether a GPS signal has been lost. The information describing the set of VMs 235 may include executing VMs 235, powered-down VMs 235, performance of VMs 235, and/or other information.

At 402, computing device 302 aggregates location information 310 for a plurality of VMs 235 executing on one or more hosts 100 in virtualized datacenter 316. Aggregating includes, but is not limited to, receiving location information 310 describing a location or position of VMs 235. For example, computing device 302 may receive (e.g., intermittently, periodically, regularly, etc.) location information 310 from each of hosts 100 (e.g., from hypervisor 210 executing on each host 100). In another example, computing device 302 fetches, or otherwise requests, location information 310 from each of hosts 100.

In some embodiments, computing device 302 maintains, and/or accesses, inventory 308 of VMs 235 in one or more virtualized datacenters 316. In one example, computing device 302 aggregates location information 310 for each of VMs 235 in inventory 308. In another example, computing device 302 aggregates location information 310 for a subset of VMs 235 in inventory 308. In this manner, computing device 302 selectively aggregates location information 310 (e.g., aggregate only for those VMs 235 in inventory 308, or only for a subset of VMs 235 in inventory 308).

For each VM 235, location information 310 includes an identifier of VM 235 and data describing a location of VM 235. Data describing a location of VM 235 may include, for example: GPS coordinates of host 100, a name of host 100 executing VM 235, an identifier of rack 318 containing host 100 executing VM 235, and/or an address of virtualized datacenter 316. As such, aggregating location information 310 may include aggregating data describing a location of hosts 100 executing VMs 235.

In some embodiments, each of hosts 100 has access to GPS data describing a location of host 100. For example, each of hosts 100 may have, or communicate with, a GPS transmitter co-located with host 100. In another example, multiple hosts 100 may share a common, co-located GPS transmitter (e.g., multiple hosts 100 in the same rack 318, array, room, building, etc.). In such embodiments, VMs 235 themselves do not have access to, nor are aware of, the GPS transmitter.

At 404, computing device 302 obtains or otherwise receives event data 312. For example, computing device 302 may poll, request, subscribe, and/or fetch event data 312 from one or more content sources. As another example, computing device 302 receives event data 312 (e.g., periodically, intermittently, regularly, etc.). Content sources include, but are not limited to, data stores, web services, and/or other computing devices storing event data 312. Exemplary event data 312 includes, but is not limited to, weather forecasts, weather alerts, seismic information, maintenance events (e.g., scheduled maintenance events), test events, alerts regarding natural disasters, and/or alerts regarding other disasters (e.g., crime, terrorism, etc.). As such, computing device 302 may obtain event data 312 from weather services, calendar services, and the like.

In some embodiments, computing device 302 selectively obtains event data 312. For example, computing device 302 requests and receives event data 312 associated with locations described by the aggregated location information 310. In this manner, computing device 302 obtains event data 312 relating only to the locations of interest to computing device 302 (e.g., those locations at which VMs 235 are executing).

At 406, computing device 302 compares the aggregated location information 310 with the received event data 312 to identify affected VMs 235. In some embodiments, computing device 302 determines whether any of the locations of VMs 235 in virtualized datacenter 316 may be affected by an adverse event represented by event data 312. For example, if event data 312 indicates that a strong storm is heading towards a particular virtualized datacenter 316, computing device 302 may identify those VMs 235 (via location information 310) executing on hosts 100 that are physically resident in the particular virtualized datacenter 316. In an example in which location information 310 describes the locations of hosts 100, computing device 302 compares location information 310 with the received event data 312 to identify affected hosts 100, and then compares the affected hosts 100 with inventory 308 of VMs 235 to identify the affected VMs 235.

In another example, if event data 312 indicates that maintenance is scheduled for a particular rack 318 in virtualized datacenter 316, computing device 302 identifies those VMs 235 (via location information 310) executed by hosts 100 physically residing in the particular rack 318.

If computing device 302 identifies any affected VMs 235 at 408, computing device 302 migrates the affected VMs 235 at 410 from their hosts 100 (affected by event data 312) to other hosts 100 (not affected by event data 312). In some embodiments, migrating the affected VMs 235 including notifying the other hosts 100 at 412 of the impending migration, and then receiving updated location information 310 at 414 from the other hosts 100 after the migration. The updated location information 310 describes the new locations of the migrated VMs 235. In this manner, computing device 302 confirms that the affected VMs 235 migrated successfully.

Computing device 302 selects the other hosts 100 based on event data 312 to ensure that the other hosts 100 are not affected by event data 312. For example, computing device 302 selects hosts 100 that are outside the forecasted path of a storm, and/or in one of racks 318 that are not scheduled for maintenance, etc.

In some embodiments, event data 312 has a time value associated therewith. The time value may indicate a period during which event data 312 is valid, and/or a point after which event data 312 is no longer valid (e.g., stale). After event data 312 becomes invalid or stale, computing device 302 may move the migrated VMs 235 back to their original hosts 100.

Alternatively or in addition to migrating the affected VMs 235, computing device 302 may power down the affected VMs 235 to protect the affected VMs 235 from any adverse event indicated by event data 312.

Figure 5:
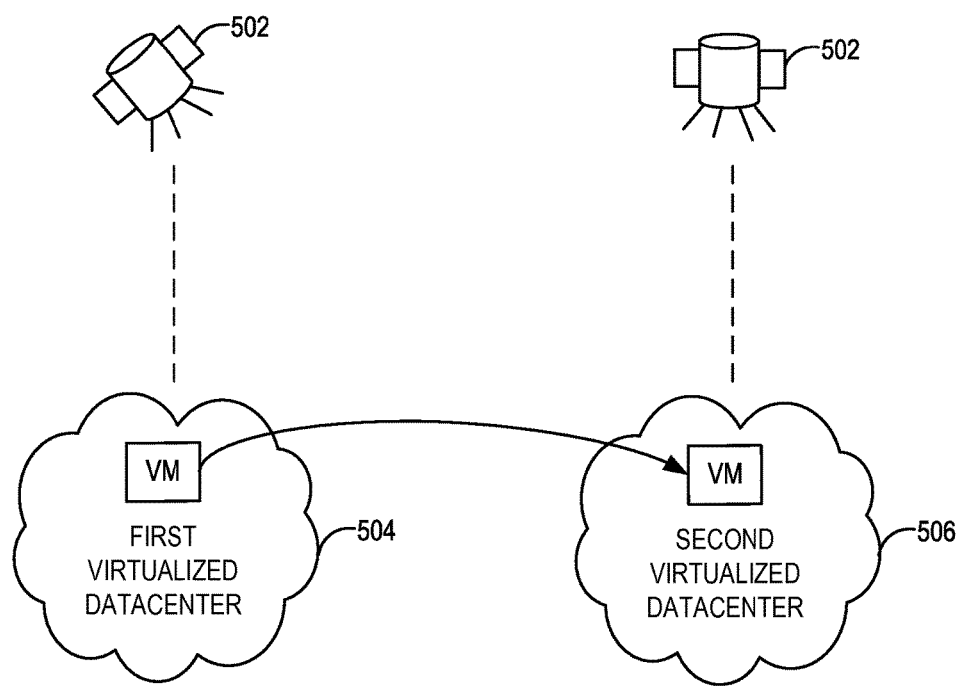
FIG. 5 is a block diagram of an example migration from one virtualized datacenter to another virtualized datacenter.

FIG. 5 is a block diagram of a migration of VM 235 from one virtualized datacenter 316 to another virtualized datacenter 316. For example, FIG. 5 illustrates performance of the operations illustrated and described in FIG. 4. Two satellites 502 capable of relaying GPS data are shown in FIG. 5, although those skilled in the art will note that any quantity of satellites 502 may be employed. Further, aspects of the disclosure are operable with positioning systems 322 other than GPS.

In operation, computing device 302 aggregates, from a plurality of hosts 100 in a first virtualized datacenter 504, location information 310 for a plurality of VMs 235 executing in first virtualized datacenter 504. In response to receipt of event data 312 describing a future adverse event, computing device 302 compares the aggregated location information 310 with the received event data 312 to identify at least one affected VM 235. Computing device 302 migrates the affected VM 235 from a host in first virtualized datacenter 504 to a host in a second virtualized datacenter 506. Migrating includes, but is not limited to, performing one or more of the following operations in anticipation of the future adverse event: moving, replicating, cloning, powering down, and/or powering up. In some embodiments, migrating is performed by operations such as vMotion and/or svMotion from VMware, Inc.

Figure 6:
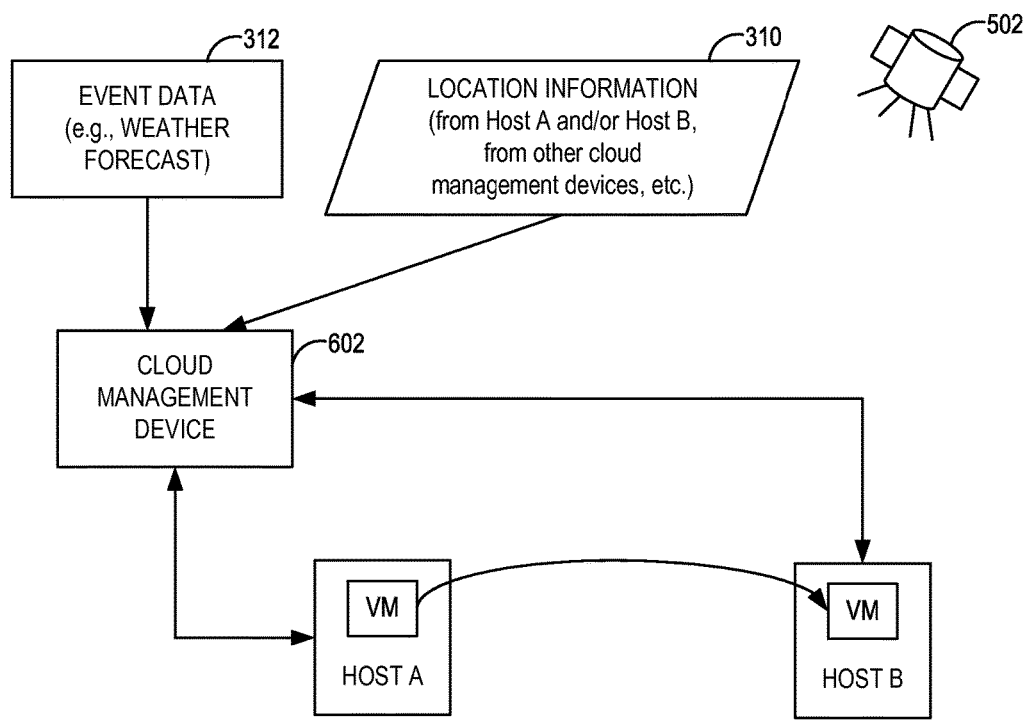
FIG. 6 is a block diagram of an exemplary implementation of a proactive virtual machine migration management system that is responsive to event data.

FIG. 6 is a block diagram of an exemplary implementation of a proactive virtual machine migration management system that is responsive to event data 312. The exemplary implementation of FIG. 6 includes cloud management software (e.g., VMware's vCenter) executing on a cloud management device 602 (e.g., computing device 302). Cloud management device 602 receives input including event data 312, such as a weather forecast or other pending disaster information, and location information 310 describing VMs 235, such as GPS data describing a location of VMs 235. Cloud management device 602 may also receive location information 310 from hosts 100, such as Host A and/or Host B, and/or other cloud management devices in other virtualized datacenters. Cloud management device 602 determines the timeline (e.g., when to migrate) based on, for example, the urgency of moving VMs 235 (and possibly moving them back after the event). The urgency may be based on a time value associated with event data 312 (e.g., countdown time to realizing an effect of a potentially adverse event).

Cloud management device 602 may also determine a priority of migration (e.g., which VMs 235 to migrate first). Prioritizing may occur, for example, based on service level agreements between virtualized datacenter 316 and its customers, types and functions of VMs 235, and the like. For example, VMs 235 supporting an emergency 911 service should be moved immediately and powered-on quickly, whereas other VMs 235 may be moved gradually and can tolerate some data loss during the transition. As a result, some VMs 235 are ranked higher than other VMs 235. VMs 235 are then migrated based on the ranking. That, the higher ranked, or prioritized, VMs 235 are migrated first by computing device 302, followed by the lower-ranked VMs 235.

Cloud management device 602 communicates with multiple hosts 100, such as Host A and Host B. Cloud management device 602 performs operations, such as those illustrated in FIG. 4, using the input event data 312 and input location information 310 to identify and migrate affected VMs 235 from one host 100 to another (e.g., Host A to Host B).

Figure 7A:
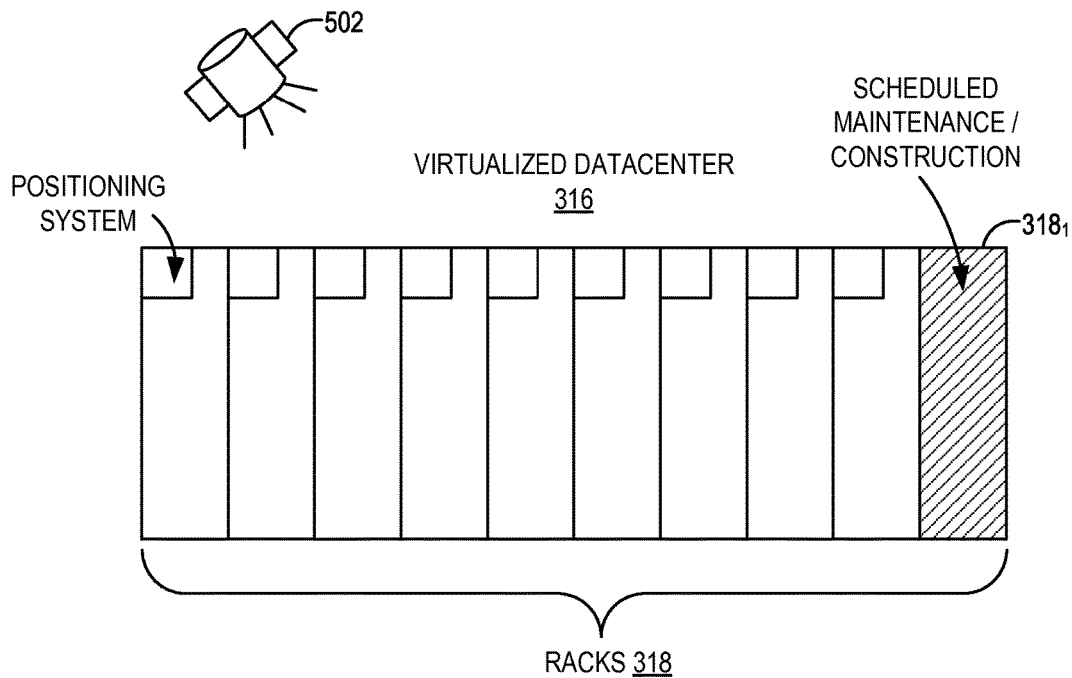
FIG. 7A and FIG. 7B are block diagrams of an example virtual machine migration from one rack to another rack in a virtualized datacenter.
Figure 7B:
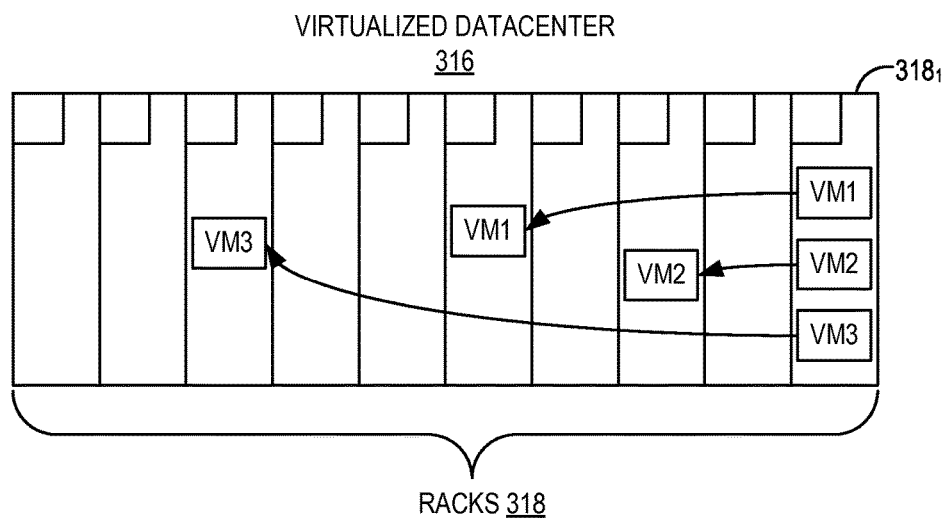

FIG. 7A and FIG. 7B are block diagrams of an example VM migration from one rack 318 to another rack 318 in virtualized datacenter 316. Each of racks 318 has a GPS transmitter sending location information 310 to one or more of satellites 502. In the scenario illustrated in FIG. 7A, one of racks 318 (e.g., rack 3181) is scheduled to undergo maintenance during which VMs 235 executing in rack 3181 will be powered down, offline, or otherwise unavailable. However, the other racks 318 will remain active. As shown in FIG. 7B, in anticipation of the scheduled maintenance, computing device 302 identifies VMs (e.g., VM 1, VM 2, and VM 3) executing in the affected rack 3181 that should be moved before the scheduled maintenance. For example, these three VMs may be identified as critical, high priority, or otherwise not tolerating disruption of execution (e.g., based on service level agreements). Computing device 302 migrates the three VMs to other racks 318 in the same datacenter 316 in advance of the scheduled maintenance. The migration may include the migration of storage 320 associated with each of the three VMs.

Figure 8A:
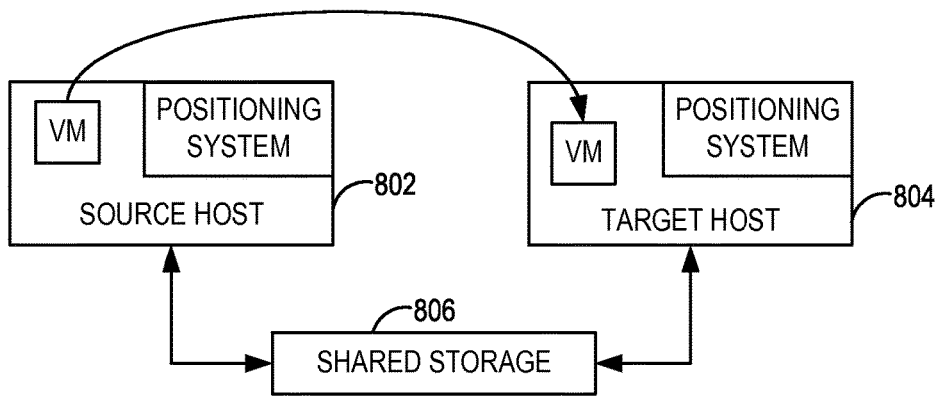
FIG. 8A is a block diagram of an example migration of a virtual machine from a first host to a second host, where the first host and the second host share storage.

In general, computing device 302 identifies a source host 802 (e.g., determined to be likely affected by a future adverse event) and a target host 804 (e.g., determined to be likely unaffected by the future adverse event). Source host 802 and target host 804 may have shared storage 806, or other common storage. For example, FIG. 8A is a block diagram of an example migration of VM 235 from source host 802 (e.g., a first host) to target host 804 (e.g., a second host), where source host 802 and target host 804 access shared storage 806. In this example, the portion of storage 806 associated with VM 235 does not have to be migrated (e.g., the VM disk, memory, etc.) as both source host 802 and target host 804 have access to the same shared storage 806. As such, migration routines such as vMotion by VMware, Inc. may be employed.

Figure 8B:
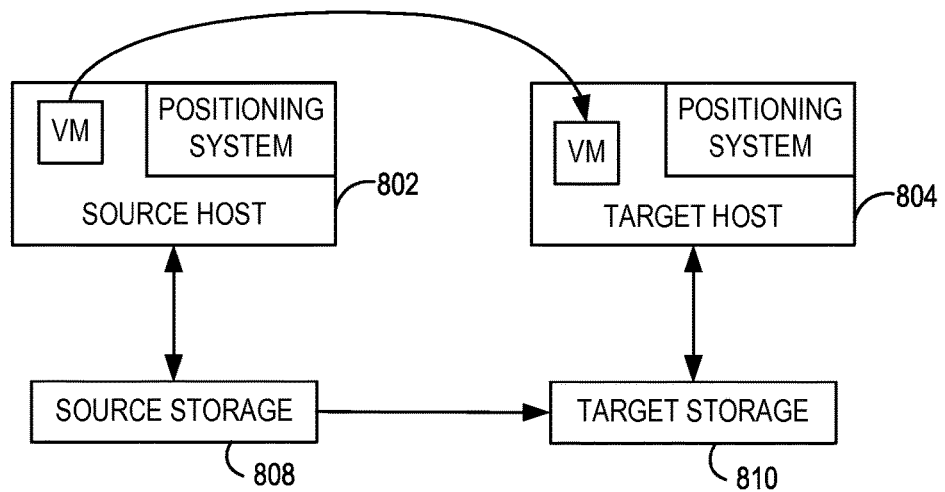
FIG. 8B is a block diagram of an example migration of a virtual machine from a first host to a second host, where the first host and the second host do not share storage.

In contrast, FIG. 8B is a block diagram of an example migration of VM 235 from source host 802 to target host 804, where source host 802 and target host 804 do not share storage. In this example, source storage 808 associated with VM 235 on source host 802 is also migrated, moved, copied, replicated, etc. with target storage 810 on target host 804 as part of the migration of VM 235 from source host 802 to target host 804. For example, a migration routine such as storage vMotion (e.g., svMotion) by VMware, Inc. may be employed.

Figure 9:
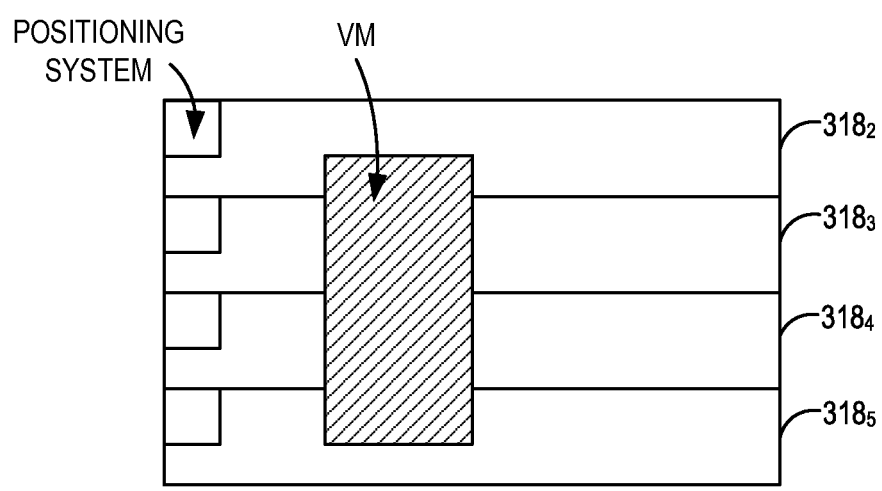
FIG. 9 is a block diagram of an example virtual machine whose resources span multiple racks in a virtualized datacenter.

While some embodiments have been described herein with reference to VMs 235 being contained in a single rack 318, some embodiments contemplate VMs 235 that span multiple racks 318. For example, FIG. 9 is a block diagram of an example VM 235 whose resources span multiple racks 318 in virtualized datacenter 316. The resources are referred to as disaggregated, in such examples. The resource include, but are not limited to, processing resources (e.g., central processing unit), working memory, persistent storage, and/or power. In this example, a single VM 235 has its processor in one rack 3182, working memory in another rack 3183, persistent storage in still another rack 3184, and power in yet another rack 3185. A software interface from the GPS transmitter on physical storage to host 100 may be used to enable computing device 302 to know which resources of which VMs 235 are on which rack 318 (e.g., physical storage).

In some embodiments, only a subset of racks 318 may be affected by event data 312. Computing device 302 then moves only the resources in the affected racks 318. For example, if only rack 3183 is affected by a potential, future adverse event, then computing device 302 moves only the memory associated with VM 235 (e.g., to another of racks 318).

ADDITIONAL EXAMPLES

The following scenarios are merely exemplary and not intended to be limiting in any way.

In one example, aspects of the disclosure are operable with hybrid cloud services. In such an example, inventory 308 of VMs 235 are divided into a plurality of cloud zones, with each of the cloud zones executing one or more VMs 235. Upon determining that an adverse event may affect VMs 235 in one of the cloud zones, computing device 302 migrates one or more (e.g., all) VMs 235 from the affected cloud zone (e.g., a first one of the cloud zones) to another cloud zone (e.g., a second one of the cloud zones).

In another example, rather than detecting a future adverse event, aspects of the disclosure react to occurrence of the adverse event. In such an example, when connectivity to an affected host 100 is lost, computing device 302 applies one or more default rules to migrate the affected VMs 235 away from the affected host 100, and then verify via a positioning system 322 (e.g., GPS) that the affected VMs 235 have been moved away from the adverse event.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for relocating VMs 235 in anticipation of adverse events. For example, some embodiments contemplate means for aggregating location information 310 for a plurality of hosts 100, means for receiving event data 312, means for comparing the aggregated location information 310 with the received event data 312 to identify affected hosts 100, means for comparing the affected hosts 100 with inventory 308 of VMs 235 to identify affected VMs 235, and means for migrating one or more of the affected VMs 235 from the affected hosts 100 to other hosts 100.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

I claim:

1. A system for relocating virtual machines (VMs) in anticipation of adverse events, said system comprising:
   a memory area associated with a computing device, said memory area storing an inventory of VMs in a virtualized datacenter; and
   a processor programmed to:
      aggregate location information for a plurality of hosts in the virtualized datacenter, the hosts executing a plurality of the VMs, the location information obtained from a plurality of racks in which the hosts are installed, wherein the each of the plurality of racks comprises a positioning system that obtains global positioning system (GPS) data from at least one GPS satellite and the location information comprises GPS coordinates of each of the racks;
      receive event data comprising a description of potential adverse events;
      compare the aggregated location information with the received event data to identify a first host anticipated to be affected by the potential adverse events;

identify a second host that is anticipated to be not affected by the potential adverse events;

compare the identified first host anticipated to be affected by the potential adverse events with the inventory of VMs stored in the memory area to identify VMs anticipated to be affected by the potential adverse events;

notify the identified second host of an impending migration of the identified VMs;

migrate one or more VMs of the identified VMs anticipated to be affected by the potential adverse events from the identified first host to the identified second host;

obtain updated location information from the one or more VMs migrated to the identified second host, the updated location information comprising the GPS coordinates of the rack where the second host is installed; and confirm successful migration of the one or more VMs migrated to the identified second host upon receiving the updated location information.

2. The system of claim 1, wherein the processor is further programmed to prioritize one VM of the one or more VMs for migration from the first host to the second host based on a service level agreement with a user.

3. The system of claim 1, wherein the processor is programmed to receive the event data by receiving at least one of a weather forecast, an upcoming scheduled maintenance event, or a scheduled test event.

4. The system of claim 1, wherein a VM of the one or more VMs has a first portion of the VM on the first host of the plurality of hosts and a second portion of the VM on the second host of the plurality of hosts, and wherein the processor is programmed to migrate the one or more of the VMs anticipated to be affected by the potential adverse events from the identified first host to the second host based at least in part on a timeline of migrating the first portion of the VM from the first host to the second host.

5. The system of claim 1, wherein the processor is further programmed to power down other VMs anticipated to be affected by the adverse event after migrating the other VMs to the other hosts.

6. The system of claim 1, wherein the inventory stored in the memory area comprises cloud zones each storing one or more of the VMs.

7. The system of claim 6, wherein the event data adversely affects a first one of the cloud zones, and wherein the processor is programmed to migrate the one or more of the VMs anticipated to be affected from the first one of the cloud zones to a second one of the cloud zones.

8. A method for relocating virtual machines (VMs) in anticipation of adverse events, said method comprising:

aggregating, by a computing device, location information for a plurality of virtual machines (VMs) executing on a plurality of hosts in a virtualized datacenter, the location information obtained from a plurality of racks in which the hosts are installed, wherein the each of the plurality of racks comprises a positioning system that obtains global positioning system (GPS) data from at least one GPS satellite and the location information comprises GPS coordinates of each of the racks;

receiving event data comprising a description of potential adverse events;

comparing the aggregated location information with the received event data to identify at least a first host of the plurality of hosts that is anticipated to be affected by the potential adverse events and to identify VMs anticipated to be affected by the potential adverse events including at least one VM executing on the identified first host;

identifying a second host of the plurality of hosts that is anticipated to be not affected by the potential adverse events;

notifying the identified second host of an impending migration of the identified VMs;

migrating the at least one VM from the identified first host to the identified second host;

obtaining updated location information from the at least one VM migrated to the identified second host, the updated location information comprising the GPS coordinates of the rack where the second host is installed; and confirming successful migration of the at least one VM migrated to the identified second host upon receiving the updated location information.

9. The method of claim 8, wherein comparing comprises comparing the aggregated location information with the received event data to identify at least one cloud zone containing the VMs anticipated to be affected.

10. The method of claim 9, wherein migrating comprises migrating the at least one VM anticipated to be affected from the cloud zone to another cloud zone.

11. The method of claim 8, wherein receiving the event data comprises obtaining, based on the aggregated location information, information regarding at least one member of a group consisting of seismic activity, natural disasters, crime, terrorism, and maintenance.

12. The method of claim 8, wherein aggregating comprises aggregating the location information for the plurality of VMs from each of the plurality of hosts.

13. The method of claim 8, further comprising identifying the second host based on the received event data.

14. The method of claim 8, further comprising maintaining an inventory of VMs in the virtualized datacenter.

15. One or more non-transitory computer-readable storage media including computer-executable instructions that, when executed, cause at least one processor to protect virtual machines (VMs) in anticipation of adverse events affecting a virtualized datacenter by performing operations comprising:

aggregating, by a computing device from a plurality of hosts, location information for a plurality of virtual machines (VMs) executing in a virtualized datacenter, the location information obtained from a plurality of racks in which the hosts are installed, wherein the each of the plurality of racks comprises a positioning system that obtains global positioning system (GPS) data from at least one GPS satellite and the location information comprises GPS coordinates of each of the racks;

receiving event data comprising a description of a future adverse event;

comparing the aggregated location information with the received event data to identify at least a first host of the plurality of hosts that is anticipated to be affected by the future adverse event and to identify VMs anticipated to be affected by the future adverse events including at least one VM executing on the identified first host;

identifying a second host of the plurality of hosts that is anticipated to be not affected by the future adverse event;

notifying the identified second host of an impending migration of the identified VMs;

migrating the at least one VM from the identified first host to the identified second host;

obtaining updated location information from the at least one VM migrated to the identified second host, the updated location information comprising the GPS coordinates of the rack where the second host is installed; and confirming successful migration of the at least one VM migrated to the identified second host upon receiving the updated location information.

16. The non-transitory computer storage media of claim 15, wherein migrating the at least one VM anticipated to be affected comprises at least one of moving, replicating, or cloning the at least one VM anticipated to be affected in anticipation of the future adverse event.

17. The non-transitory computer storage media of claim 15, wherein the computer-executable instructions further cause the processor to prioritize the plurality of VMs.

18. The non-transitory computer storage media of claim 17, wherein the computer-executable instructions further cause the processor to migrate, based on the prioritization, higher priority VMs before migrating lower priority VMs.

* * * * *